(12) United States Patent
Shibata

(10) Patent No.: US 9,448,925 B2
(45) Date of Patent: Sep. 20, 2016

(54) SEMICONDUCTOR STORAGE DEVICE AND SEMICONDUCTOR STORAGE DEVICE CONTROL METHOD

(71) Applicant: FUJITSU LIMITED, Kawasaki, Kanagawa (JP)

(72) Inventor: Seiki Shibata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 14/295,097

(22) Filed: Jun. 3, 2014

(65) Prior Publication Data

US 2015/0052291 A1 Feb. 19, 2015

(30) Foreign Application Priority Data

Aug. 19, 2013 (JP) ................................ 2013-169707

(51) Int. Cl.
*G06F 12/10* (2016.01)
*G06F 12/02* (2006.01)

(52) U.S. Cl.
CPC ... *G06F 12/0246* (2013.01); *G06F 2212/7211* (2013.01)

(58) Field of Classification Search
CPC ............................ G06F 12/0246; G06F 12/10
USPC ........................ 711/103, 156, 157, 165, 202; 365/185.33
See application file for complete search history.

(56) References Cited

U.S. PATENT DOCUMENTS

| | | | | |
|---|---|---|---|---|
| 5,559,956 A * | 9/1996 | Sukegawa | ........... | G06F 12/0246 711/E12.014 |
| 5,673,383 A * | 9/1997 | Sukegawa | ........... | G06F 12/0246 711/E12.014 |
| 6,049,855 A * | 4/2000 | Jeddeloh | ............. | G06F 12/0607 710/312 |
| 6,202,133 B1 * | 3/2001 | Jeddeloh | ............. | G06F 12/0607 711/157 |
| 6,230,233 B1 * | 5/2001 | Lofgren | .............. | G06F 12/0246 365/185.3 |
| 6,327,639 B1 * | 12/2001 | Asnaashari | ........... | G06F 3/0613 156/165 |
| 6,580,647 B1 * | 6/2003 | Yokota | ..................... | G11C 7/16 365/185.33 |
| 6,594,183 B1 * | 7/2003 | Lofgren | .............. | G06F 12/0246 365/185.09 |
| 6,850,443 B2 * | 2/2005 | Lofgren | .............. | G06F 12/0246 365/185.11 |
| 6,988,163 B2 * | 1/2006 | Malueg | ............... | G06F 9/44573 365/185.33 |

(Continued)

FOREIGN PATENT DOCUMENTS

| | | |
|---|---|---|
| JP | 09-293386 A | 11/1997 |
| JP | 2007-184072 A | 7/2007 |

(Continued)

OTHER PUBLICATIONS

Qureshi, et al., "Enhancing Lifetime and Security of PCM-Based Main Memory with Start-Gap Wear Leveling," Proceedings of the 42nd Annual IEEE/ACM International Symposium on Microarchitecture (MICRO 42), Dec. 12-16, 2009, pp. 1-10, New York, NY, USA.

Primary Examiner — Stephen Elmore
(74) Attorney, Agent, or Firm — Arent Fox LLP

(57) ABSTRACT

A semiconductor storage device includes: a storage; an address translater configured to translate a logical address for access to the storage to a physical address based on address translation information; and a controller configured to output the address translation information to the address translater, wherein the controller, when the address translation information is changed, interchanges a first physical address based on first address translation information before the change and a second physical address based on second address translation information after the change in the storage.

15 Claims, 18 Drawing Sheets

(56) References Cited

U.S. PATENT DOCUMENTS

| | | | |
|---|---|---|---|
| 7,480,766 B2 * | 1/2009 | Gorobets | G06F 3/0607 711/115 |
| 7,646,636 B2 * | 1/2010 | Kim | G06F 12/0246 365/168 |
| 7,797,481 B2 * | 9/2010 | Lee | G06F 12/0246 711/103 |
| 8,045,377 B2 * | 10/2011 | Kim | G06F 12/0246 365/168 |
| 8,375,160 B2 * | 2/2013 | Nakanishi | G06F 12/0246 365/185.33 |
| 8,391,064 B2 * | 3/2013 | Kim | G06F 12/0246 365/168 |
| 8,553,457 B2 * | 10/2013 | Kim | G06F 12/0246 365/168 |
| 8,751,734 B2 * | 6/2014 | Maeda | G06F 3/0613 365/185.11 |
| 2007/0033323 A1 * | 2/2007 | Gorobets | G06F 3/0607 711/103 |
| 2007/0153619 A1 | 7/2007 | Choo et al. | |
| 2012/0204071 A1 | 8/2012 | Abali et al. | |

FOREIGN PATENT DOCUMENTS

| | | |
|---|---|---|
| JP | 2008-287803 A | 11/2008 |
| JP | 2012-027991 A | 2/2012 |

* cited by examiner

FIG. 15

| GENERAL BINARY NUMBER | GRAY CODE |
|---|---|
| 000 | 000 |
| 001 | 001 |
| 010 | 011 |
| 011 | 010 |
| 100 | 110 |
| 101 | 111 |
| 110 | 101 |
| 111 | 100 |

SEMICONDUCTOR STORAGE DEVICE AND SEMICONDUCTOR STORAGE DEVICE CONTROL METHOD

CROSS-REFERENCE TO RELATED APPLICATION

This application is based upon and claims the benefit of priority of the prior Japanese Patent Application No. 2013-169707, filed on Aug. 19, 2013, the entire contents of which are incorporated herein by reference.

FIELD

Embodiment discussed herein is related to a semiconductor storage device and a semiconductor storage device control method.

BACKGROUND

A rewrite count in a highly-integrated, large-capacity non-volatile semiconductor storage device (memory) is finite. When accesses concentrate on a limited portion (address), the access-concentrated portion is degraded earlier than other portions to possibly become incapable of performing storing operation, leading to memory failure.

Related arts are disclosed in Japanese Laid-open Patent Publication No. 09-293386, Japanese Laid-open Patent Publication No. 2007-184072, Japanese Laid-open Patent Publication No. 2008-287803, Japanese Laid-open Patent Publication No. 2012-027991, U.S. Patent Application Publication No. 2012/0204071, and Moinuddin K. Qureshi, John Karidis, Michele Franceschini, Vijayalakshmi Srinivasan, Luis Lastras, and Bulent Abali, "Enhancing lifetime and security of PCM-based main memory with start-gap wear leveling", *Proceedings of the 42nd Annual IEEE/ACM International Symposium on Microarchitecture (MICRO 42)*, 2009.

SUMMARY

According to aspect of the embodiments, a semiconductor storage device includes: a storage; an address translater configured to translate a logical address for access to the storage to a physical address based on address translation information; and a controller configured to output the address translation information to the address translater, wherein the controller, when the address translation information is changed, interchanges a first physical address based on first address translation information before the change and a second physical address based on second address translation information after the change in the storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 depicts an example of a correspondence between binary numbers and Gray codes;

DESCRIPTION OF EMBODIMENT

Ware leveling to level the rewrite count to each portion (address) may be performed. In a memory access, a physical address obtained by translating a logical address externally input is decoded, and a storage cell in a memory is accessed. The relation between the logical address and the physical address is fixed. When ware leveling is performed, an address translating unit is provided, where a logical address is translated to a physical address based on address translation information, and the address translation information is changed.

Since written data is accessed based on the original physical address, the stored data is inaccessible when the address translation information is changed. For this reason, the address translation information is changed when the stored data becomes no longer accessed based on an erase request or an initialization request for the written data. Address translation may be performed in units of blocks dividing a physical space.

If the address translation information is changed only at the time of a memory initialization request or a data erase request, the frequency of changes of the address translation information is decreased, and the effect of ware leveling may not be obtained.

Figure 1:
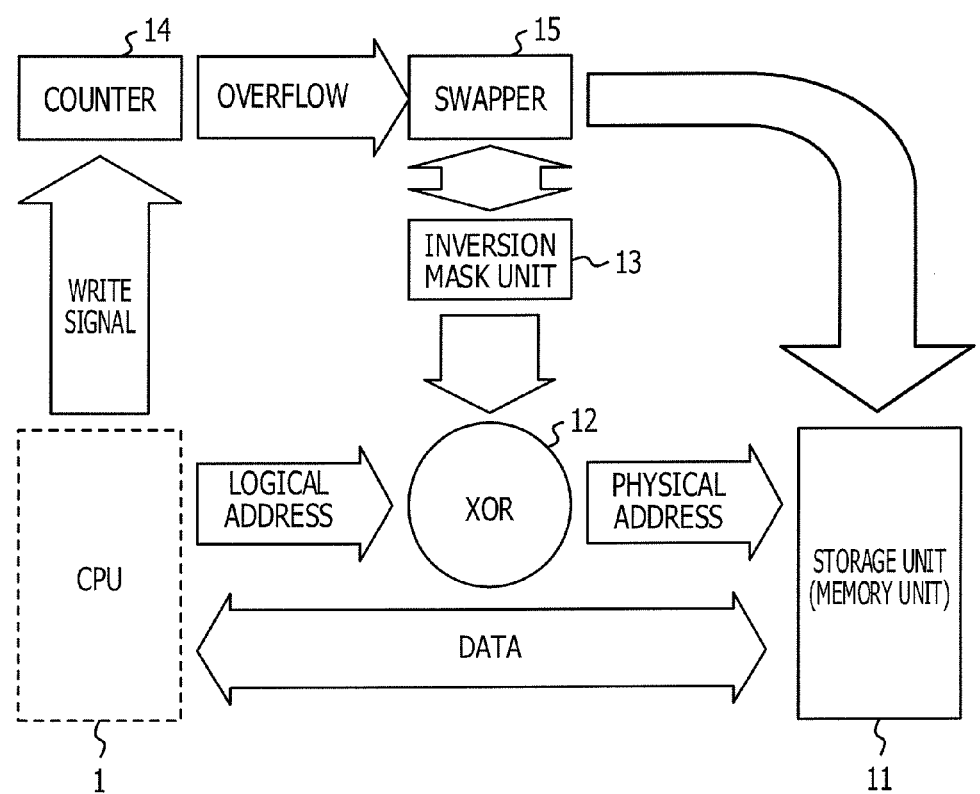
FIG. 1 depicts an example of a semiconductor storage device.

FIG. 1 depicts an example of a semiconductor storage device.

A semiconductor storage device (memory) includes a storage unit (memory unit) 11, an address translating unit (XOR) 12, an inversion mask unit 13, a counter 14, and a swapper (swap processing unit) 15. The memory unit 11 may be a non-volatile memory. While a CPU 1 accesses a memory in FIG. 1, this is not meant to be restrictive. When the CPU 1 accesses (writes or reads data to or from) the memory, the CPU 1 outputs a logical address to the memory. When writing, the CPU 1 outputs write data to the memory. When reading, the CPU 1 receives data read from the memory. The CPU 1 outputs a write signal (write-enable) to the memory when writing and a read signal (read-enable) to the memory when reading, together with any other control signal.

The address translating unit (XOR) 12 computes the exclusive OR (XOR) of a logical address input to the memory and address translation information (inversion mask) stored in the inversion mask unit 13 to generate a physical address and supplies the physical address to the memory unit 11. In writing, write data is supplied to the memory unit 11 in synchronization with the supply of the physical address to the memory unit 11. In reading, read data is output from the memory unit 11 to the CPU 1 in synchronization with the supply of the physical address to the memory unit 11. Operations other than the address translating process by the XOR 12 may be substantially identical or similar to other memory access operations.

The XOR 12 computes the XOR of the logical address and the inversion mask to generate a physical address. A different physical address is generated with a change of the inversion mask. For this reason, with the inversion mask changed, the correspondence between the logical address and the physical address is changed, and ware leveling is performed to reduce uneven distribution of physical addresses even if address values of logical addresses for write operation are unevenly distributed.

For example, read data may be changed because the physical address of the memory to be read with the same logical address is changed before and after the change of the inversion mask. For this reason, the change of the inversion mask may be performed at the time of a memory initialization request or data erase request.

In the memory depicted in FIG. 1, the swapper 15 performs a swap process of changing the inversion mask at a certain timing and interchanging data at a former physical address based on a former inversion mask before the change and data at a new physical address based on a new inversion mask after the change in the memory unit 11. In FIG. 1, the counter 14 counts the number of write operations to the memory. When the count value of the counter 14 exceeds a certain value (when an overflow occurs), the inversion mask is changed and the swapper 15 is started. The swapper 15 may be started not based on the number of write operations but based on an elapsed time or the like.

Figure 2:
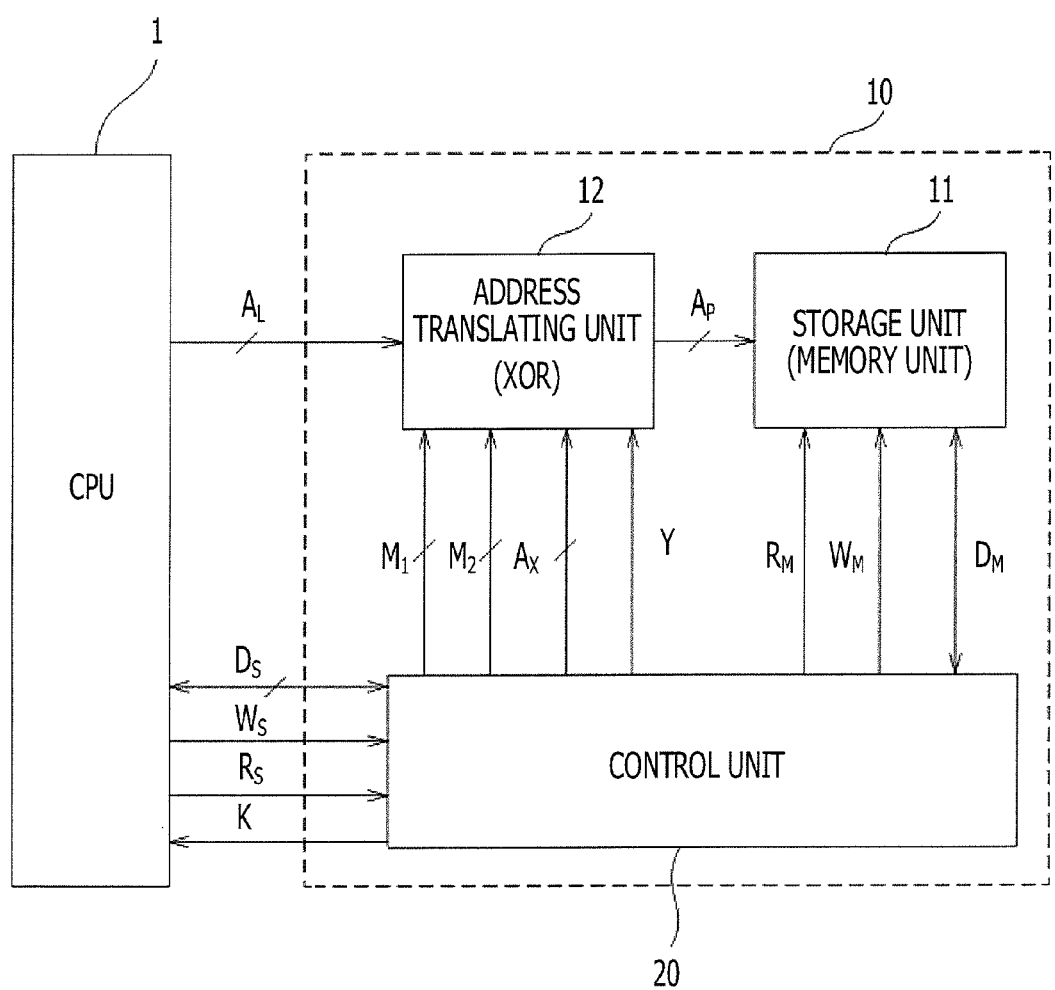
FIG. 2 depicts an example of a semiconductor storage device.

FIG. 2 depicts an example of a semiconductor storage device. A semiconductor storage device (memory) 10 depicted in FIG. 2 includes the storage unit (memory unit) 11, the address translating unit (XOR) 12, and a control unit 20. The inversion mask unit 13, the counter 14, and the swapper 15 may be formed in the control unit 20. In FIG. 2, the CPU 1 accesses the memory 10.

A logical address $A_L$ output by the CPU 1 is input to the address translating unit 12. A physical address $A_P$ obtained by translation at the XOR 12 is supplied to the memory unit 11. Between the CPU 1 and the control unit 20, input/output data $D_S$ (read data and write data) are input and output. The CPU 1 outputs a write signal $W_S$ and a read signal $R_S$ to the control unit 20.

The control unit 20 outputs a former inversion mask $M_1$, a new inversion mask $M_2$, a swap address $A_X$, and a swap address enable signal Y to the XOR 12. The control unit 20 outputs a write signal $W_M$ and a read signal $R_M$, and also outputs and inputs input/output data $D_M$ (read data and write data) to and from the memory unit 11. The write signal $W_M$ and the read signal $R_M$ may correspond to the write signal $W_S$ and the read signal $R_S$ output from the CPU 1 to the memory 10, and the timing may be adjusted in synchronization with the supply of the physical address $A_P$ to the memory unit 11. The input/output data $D_M$ corresponds to the input/output data $D_S$ input and output between the CPU 1 and the memory 10, with different timings. The control unit 20 outputs an access pending flag K indicating that a write, read, or swap process is being performed and access is not enabled. For example, the access pending flag K may indicate "1" during a write process or read process, and then "0" when the write process or read process ends. For example, the access pending flag K may indicate "1" during a swap process while data for one line at a former physical address and data at a new physical address are exchanged, and may be kept at "1" while the write signal $W_S$ or the read signal $R_S$ is not input at the end of data interchange for one line.

For example, in normal operation, the swap address enable signal Y indicates "true (0)", and the XOR 12 computes the XOR of the logical address $A_L$ and the new inversion mask $M_2$ and supplies the physical address $A_P$ to the memory unit 11. In a swap process, the swap address enable signal Y becomes "false (1)", and the XOR 12 supplies the swap address $A_X$ to the memory unit 11. When the memory is accessed by the CPU 1 in the swap process, the swap address enable signal Y becomes "true", and if the logical address $A_L$ from the CPU 1 is a rewritten address, the XOR 12 computes the XOR of the logical address $A_L$ and a new inversion mask $M_0$ to output the physical address $A_P$. When the memory is accessed by the CPU 1 in the swap process, the swap address enable signal Y becomes "true", and if the logical address $A_L$ from the CPU 1 is an address before rewriting, the XOR 12 computes the XOR of the logical address $A_L$ and the former inversion mask $M_1$ to output the physical address $A_P$.

For the address indicated by the physical address $A_P$, the memory unit 11 writes the input/output data (write data) $D_S$ if the write signal $W_M$ is supplied, and the memory unit 11 outputs the input/output data (read data) $D_S$ if the read signal $R_M$ is supplied.

Figure 3:
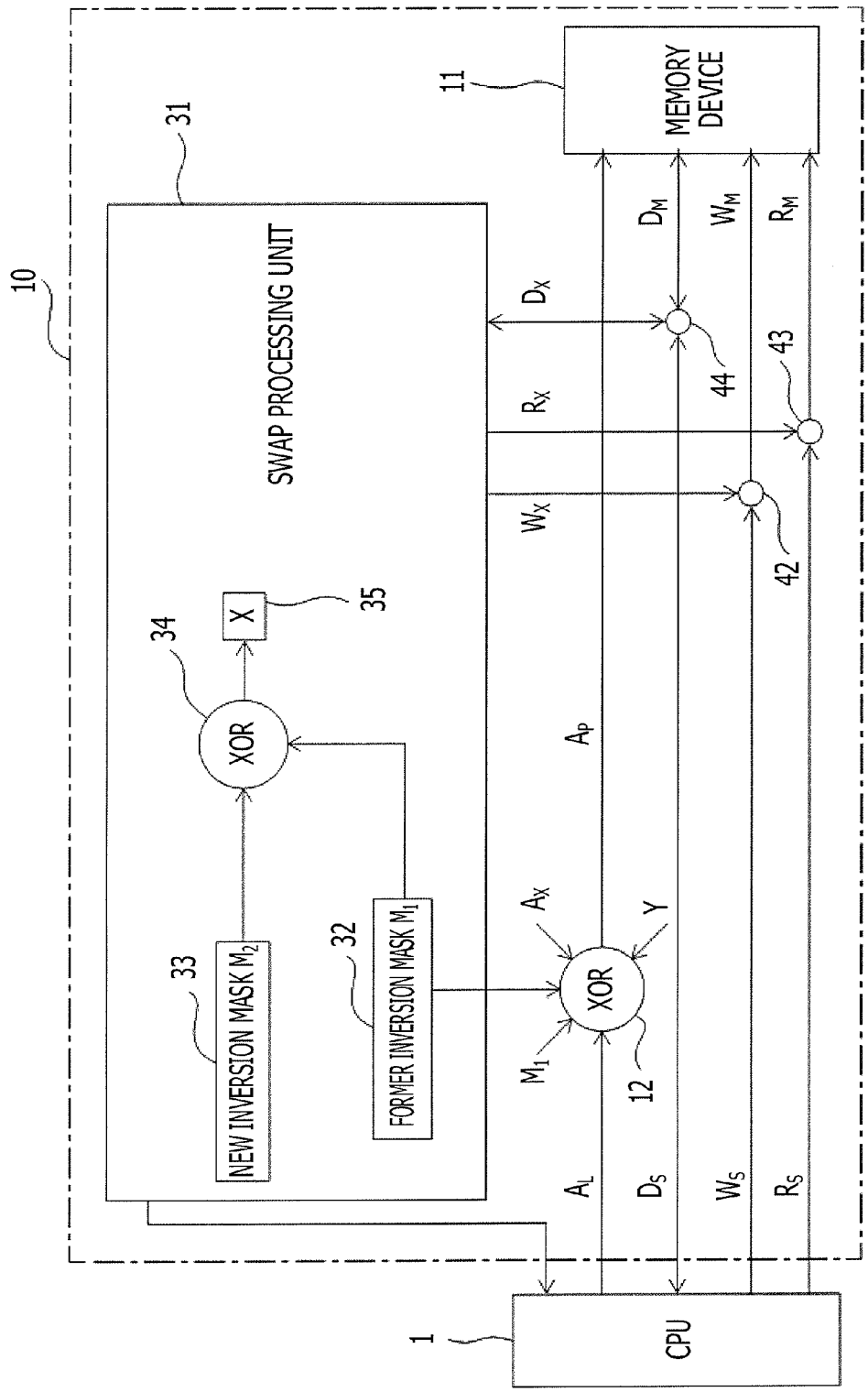
FIG. 3 depicts an example of a semiconductor storage device.

FIG. 3 depicts an example of a semiconductor storage device. The memory 10 depicted in FIG. 3 includes the storage unit (memory device) 11, a swap processing unit 31, the address translating (XOR) unit 12, a write signal changeover switch 42, a read signal changeover switch 43, and a data changeover switch 44.

The swap processing unit 31 may include, for example, a state machine as part of the control unit 20. The swap processing unit 31 includes a former inversion mask register 32 which retains the former inversion mask $M_1$, a new inversion mask register 33 which retains the new inversion mask $M_2$, an XOR computing unit 34, and a register 35 which retains an XOR computation result X, thereby performing a swap process. The XOR computing unit 34 computes the exclusive OR (XOR) of the former inversion mask $M_1$ and the new inversion mask $M_2$. The computation result of the XOR computing unit 34 may be data with a bit different between the former inversion mask $M_1$ and the new inversion mask $M_2$ being 1 and other bits being 0. The swap processing unit 31 outputs the former inversion mask $M_1$, the new inversion mask $M_2$, the swap address $A_X$, and the swap address enable signal Y to the address translating (XOR) unit 12. The swap processing unit 31 outputs a swap write signal $W_X$ and a swap read signal $R_X$ to the write signal changeover switch 42 and the read signal changeover switch 43. The swap processing unit 31 inputs and outputs swap data $D_X$ to and from the data changeover switch 44. The swap processing unit 31 controls the connection among the write signal changeover switch 42, the read signal changeover switch 43, and the data changeover switch 44.

The address translating (XOR) unit 12 receives the logical address $A_L$, the former inversion mask $M_1$, the new inversion mask $M_2$, the swap address $A_X$, and the swap address enable signal Y to generate the physical address $A_P$. In response to the control of the swap processing unit 31, the write signal changeover switch 42 selects one of the write signal $W_S$ from the CPU 1 and the swap write signal $W_X$ and outputs the selected signal to the memory device 11. In response to the control of the swap processing unit 31, the read signal changeover switch 43 selects one of the read signal $R_S$ from the CPU 1 and the swap read signal $R_X$, and outputs the selected signal to the memory device 11. In response to the control of the swap processing unit 31, the data changeover switch 44 selects one of the input/output data $D_S$ to and from the CPU 1 and the swap data $D_X$ and inputs and outputs the selected data to and from the memory device 11.

Figure 4:
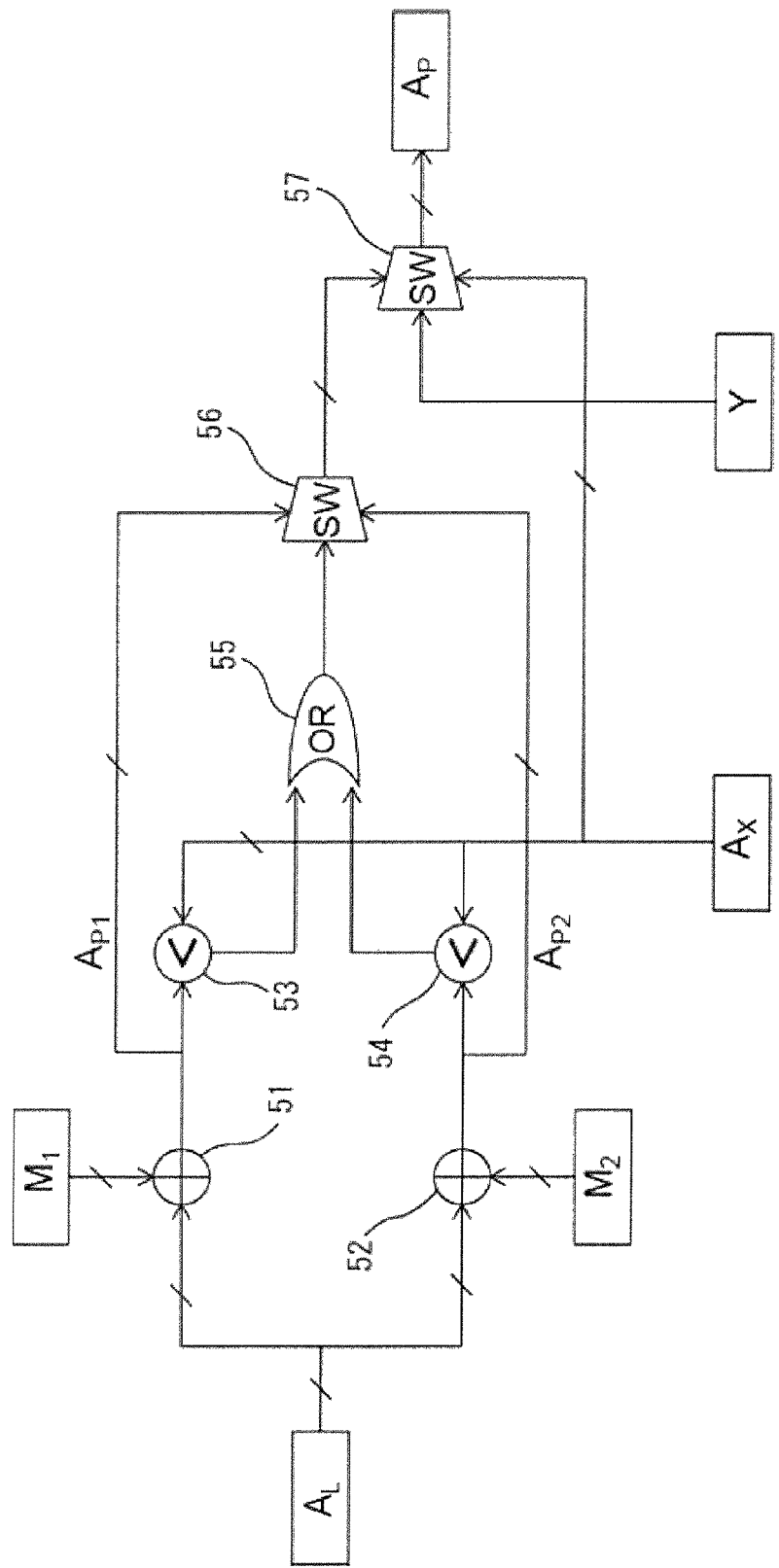
FIG. 4 depicts an example of an address translating unit.

FIG. 4 depicts an example of an address translating unit. The address translating (XOR) unit 12 includes two XOR gates 51 and 52, two comparators 53 and 54, an OR gate 55, and two switches 56 and 57. The XOR gate 51 computes the exclusive OR (XOR) of the logical address $A_L$ and the former inversion mask $M_1$ and outputs a former mask translation address $A_{P1}$. The XOR gate 52 computes the XOR of the logical address $A_L$ and the new inversion mask $M_2$ and outputs a new mask translation address $A_{P2}$. The comparator 53 compares the former mask translation address $A_{P1}$ and the swap address $A_X$ and, for example, outputs a comparison result of "true (0)" when the swap address $A_X$ is larger and a comparison result of "false (1)" when the swap address $A_X$ is smaller. The comparator 54 compares the new mask translation address $A_{P2}$ and the swap address $A_X$ and, for example, outputs a comparison result of "true (0)" when the swap address $A_X$ is larger and a comparison result of "false (1)" when the swap address $A_X$ is smaller. The OR gate 55 computes the logical OR (OR) of the outputs from the comparators 53 and 54. Therefore, when the swap address $A_X$ is larger than both of the former mask translation address $A_{P1}$ and the new mask translation address $A_{P2}$, the output from the OR gate 55 may become "true (0)". The switch 56 selects the former mask translation address $A_{P1}$ when the output from the OR gate 55 indicates "true (0)" and the new mask translation address $A_{P2}$ when the output from the OR gate 55 indicates "false (1)". The switch 57 selects the output from the switch 56 when the swap address enable signal Y indicates "true (0)" and selects the swap address $A_X$ when the swap address enable signal Y indicates "false (1)".

The XOR unit 12 outputs the new mask translation address $A_{P2}$ as the physical address $A_P$ when the swap address enable signal Y indicates "true (0)" and no swap process is performed. When the swap address enable signal Y indicates "true" during a swap process, the XOR unit 12 outputs, as the physical address $A_P$, the former mask translation address $A_{P1}$ when the former mask translation address $A_{P1}$ and the new mask translation address $A_{P2}$ are both smaller than the swap address $A_X$ and the new mask translation address $A_{P2}$ when both are larger than the swap address $A_X$. When the swap address enable signal Y indicates "false (1)", the XOR unit 12 outputs the swap address $A_X$ as the physical address $A_P$.

A swap process is started when a write process is performed a certain number of times, generating the new inversion mask $M_2$ and rewriting the former inversion mask $M_1$. A parameter indicating the value of a counter which counts the number of times of the write process is represented by $C_W$. In a swap process, the swap address $A_X$ is changed in sequence. When the swap address $A_X$ is smaller than the exclusive OR (XOR) of the swap address $A_X$, the former inversion mask $M_1$, and the new inversion mask $M_2$, data in the memory unit 11 indicated by the swap address $A_X$ and data in the memory unit 11 indicated by the XOR of the swap address $A_X$, the former inversion mask $M_1$, and the new inversion mask $M_2$ are swapped. When the swap address $A_X$ is larger than the XOR of the swap address $A_X$, the former inversion mask $M_1$, and the new inversion mask $M_2$, no process is performed because swapping has been done. In the drawings, an exclusive OR is represented by a sign Λ. Therefore, the exclusive OR of the swap address $A_X$, the former inversion mask $M_1$, and the new inversion mask $M_2$ is represented by $A_X \Lambda M_1 \Lambda M_2$.

Figure 5:
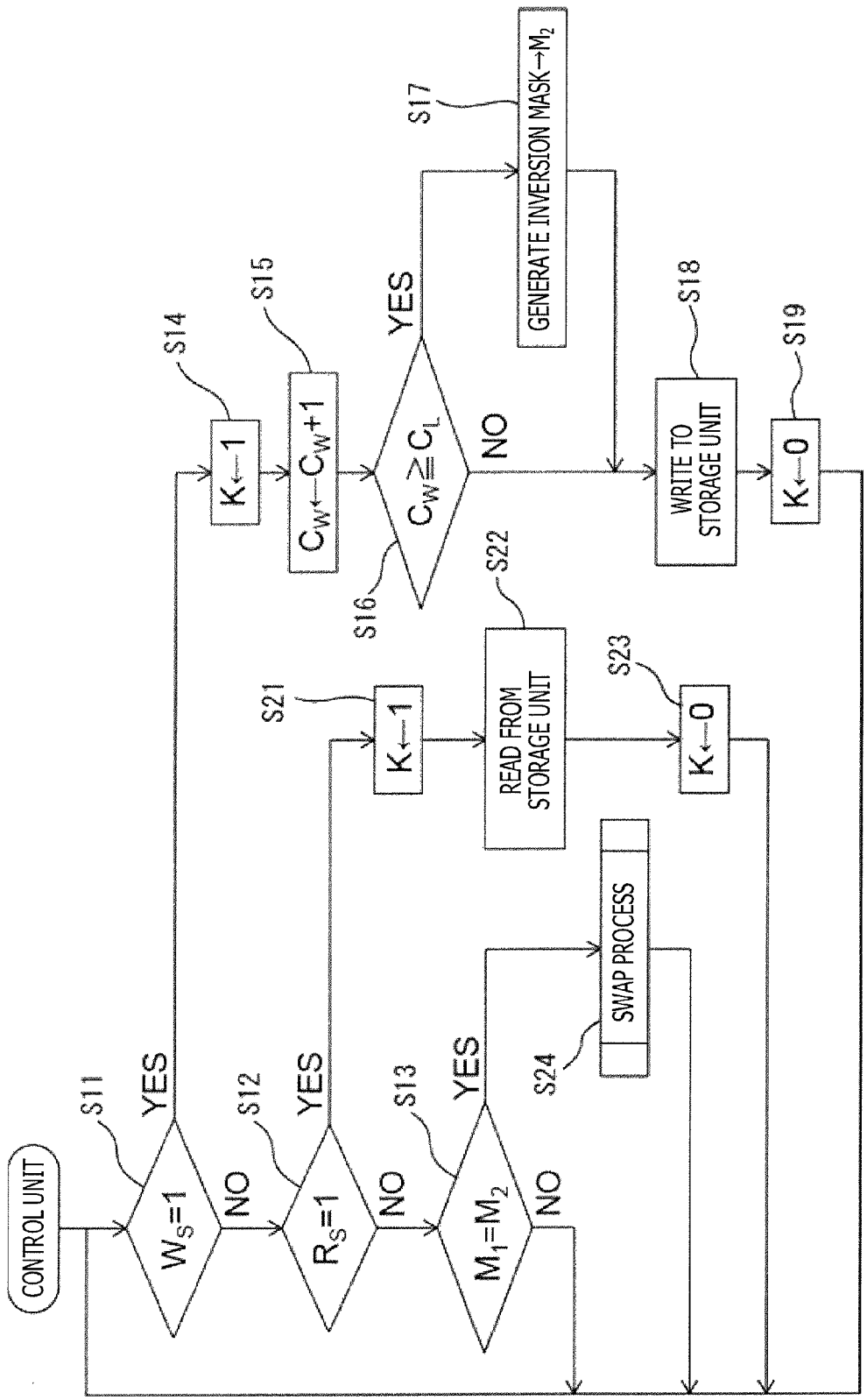
FIG. 5 depicts an example of an operation of a control unit.

FIG. 5 depicts an example of an operation of a control unit. Prior to the start of a process, initialization is performed such that the former inversion mask $M_1$=the new inversion mask $M_2$=0, the swap address $A_X$=0, and the parameter $C_W$=0.

In operation S11, it is determined whether the write signal $W_S$ from the CPU 1=1, for example, whether the signal represents a write request. When it is determined that $W_S$=1, the process proceeds to operation S14. When it is not determined that $W_S$=1, the process proceeds to operation S12.

In operation S12, it is determined whether the read signal $R_S$ from the CPU 1=1, for example, whether the signal represents a read request. When it is determined that $R_S$=1, the process proceeds to operation S21. When it is not determined that $R_S$=1, the process proceeds to operation S13.

In operation S13, it is determined whether the former inversion mask $M_1$=the new inversion mask $M_2$, for example, whether a swap process is being performed. When it is determined that $M_1$=$M_2$, the process proceeds to operation S24. When it is not determined that $M_1$=$M_2$, the process returns to operation S11 to repeat the process.

In operation S14, the access pending flag K is set at 1. In operation S15, the parameter $C_W$ is incremented by 1. In operation S16, it is determined whether the parameter $C_W$ is equal to or larger than a value $C_L$. When the parameter $C_W$ is equal to or larger than the value $C_L$, the process proceeds to operation S17. When the parameter $C_W$ is not equal to or larger than the value $C_L$, the process proceeds to operation S18.

In operation S17, an inversion mask different from previous inversion masks is generated, and is set as the new inversion mask $M_2$. In operation S18, writing to the storage unit 11 is performed. In operation S19, the access pending flag K is set at 0, and the process returns to operation S11.

In operation S21, the access pending flag K is set at 1. In operation S22, reading from the storage unit 11 is performed. In operation S23, the access pending flag K is set at 0, and the process returns to operation S11. In operation S24, a swap process is performed, and the process returns to operation S11.

Figure 6:
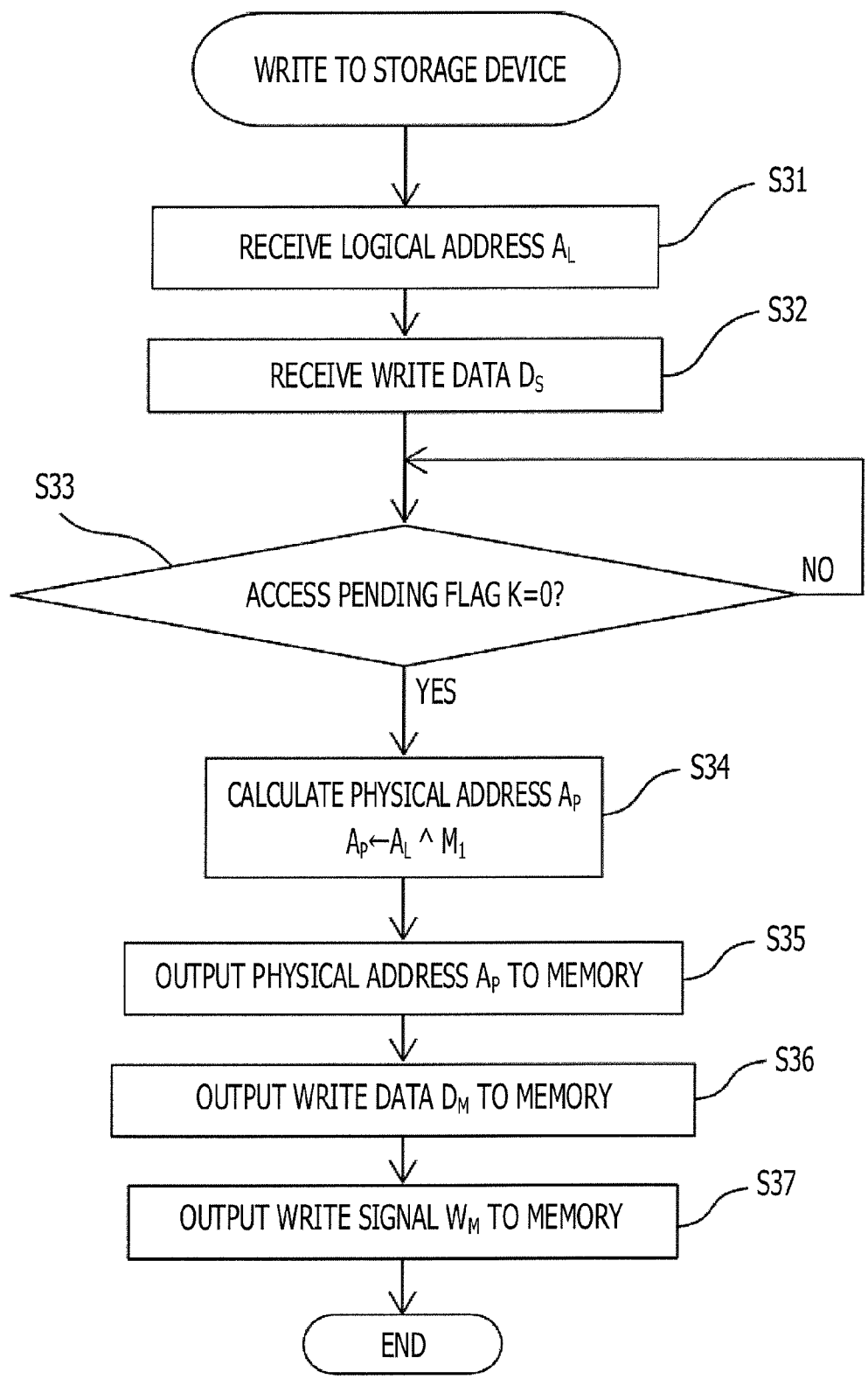
FIG. 6 depicts an example of a write process.

FIG. 6 depicts an example of a write process. The write process depicted in FIG. 6 may be performed by the semiconductor storage device depicted in FIG. 1 to FIG. 3.

In operation S31, the semiconductor storage device receives the logical address $A_L$ from the CPU 1. In operation S32, the semiconductor storage device receives the write data $D_S$ from the CPU 1. In operation S33, it is determined whether the access pending flag K=0, for example, whether access is enabled. When K=0, the process proceeds to operation S34. When it is not determined that K=0, the process waits.

In operation S34, the XOR of the logical address $A_L$ and the inversion mask is computed to calculate the physical address $A_P$. As the inversion mask, the former inversion mask is used unless swapping is being performed. The new inversion mask may not be present at this moment. If swapping is being performed, the former inversion mask is used when the write address is a non-swapped address, and the new inversion mask is used when the write address is a swapped address.

In operation S35, the physical address $A_P$ is output to the memory unit 11. In operation S36, the write data $D_M$ (identical to the input/output data $D_S$) is output to the memory unit 11. In operation S37, the write signal $W_M$ is output to the memory unit 11.

Figure 7:
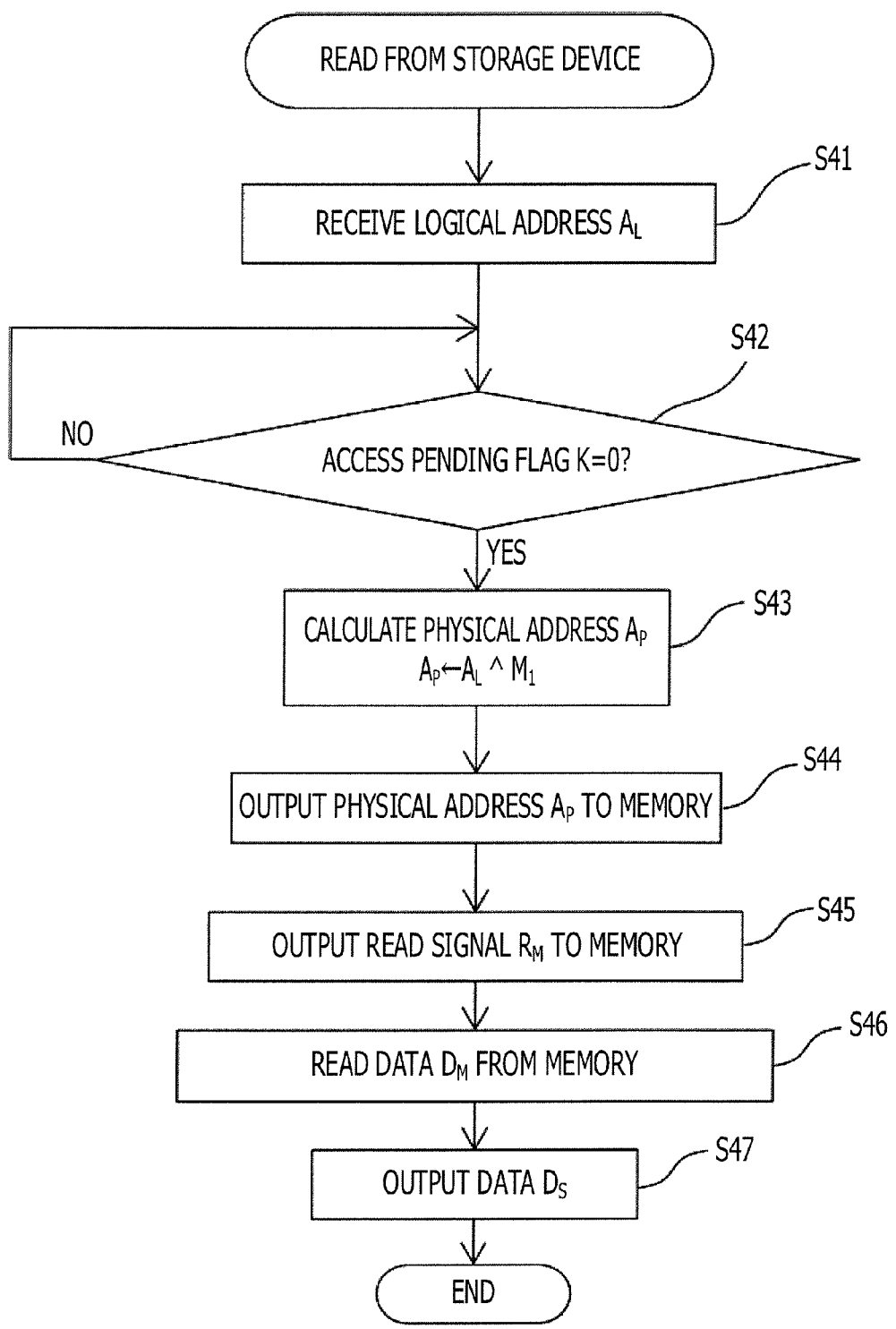
FIG. 7 depicts an example of a read process.

FIG. 7 depicts an example of a read process. The read process depicted in FIG. 7 may be performed by the semiconductor storage device depicted in FIG. 1 to FIG. 3. In operation S41, the logical address $A_L$ is received from the CPU 1. In operation S42, it is determined whether the access pending flag K=0, for example, whether access is enable. When K=0, the process proceeds to operation S43. When it is not determined that K=0, the process waits.

In operation S43, the XOR of the logical address $A_L$ and the inversion mask is computed to calculate the physical address $A_P$. As the inversion mask, the former inversion mask may be used unless swapping is being performed. The new inversion mask may not be present at this moment. If swapping is being performed, the former inversion mask is used when the write address is a non-swapped address, and the new inversion mask is used when the write address is a swapped address.

In operation S44, the physical address $A_P$ is output to the memory unit 11. In operation S45, the read signal $R_M$ is output to the memory unit 11. In operation S46, the read data $D_M$ is read from the memory unit 11. In operation S47, the read data $D_S$ is output to the CPU 1.

Figure 8:
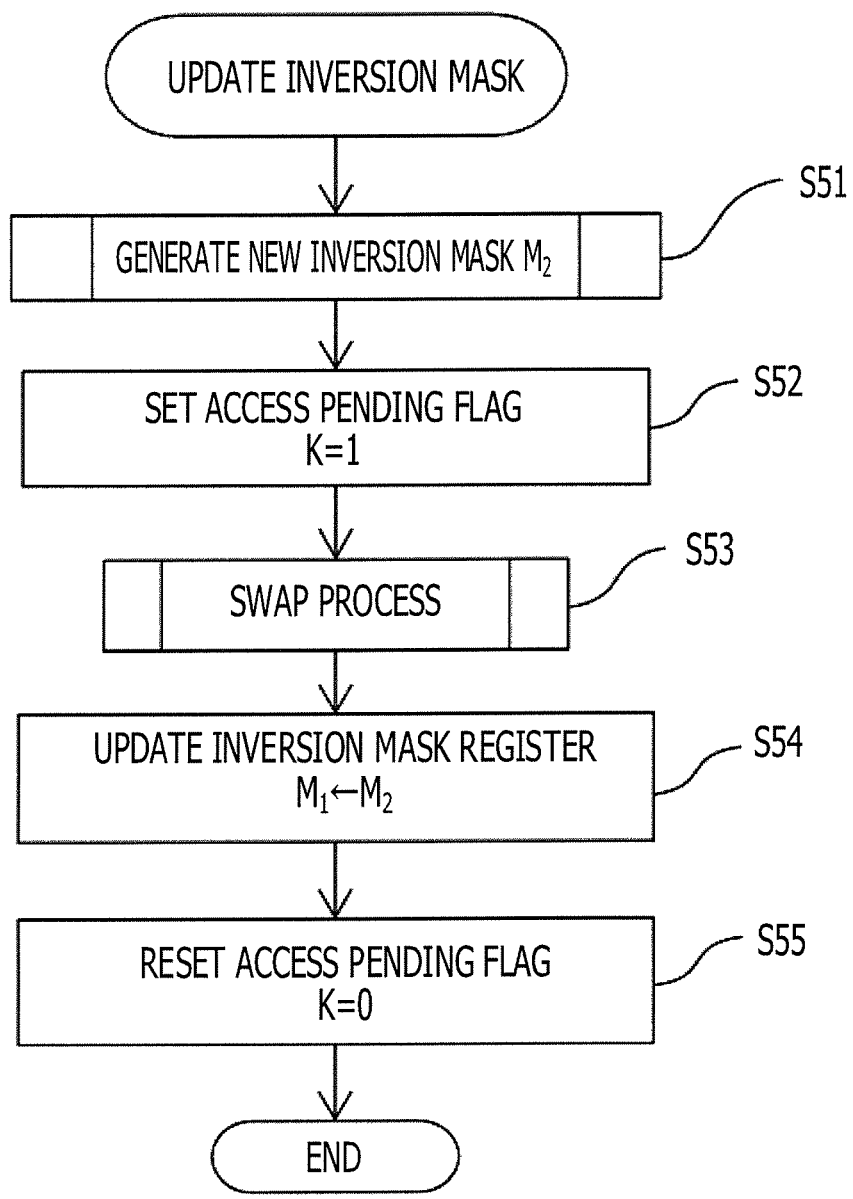
FIG. 8 depicts an example of a mask updating process.

FIG. 8 depicts an example of a mask updating process. In FIG. 8, a process of updating from the former inversion mask $M_1$ to the new inversion mask $M_2$ is performed. In operation S51, the new inversion mask $M_2$ is generated.

In operation S52, the access pending flag K=1 is set. In operation S53, a swap process is performed. In operation S54, the inversion mask stored in the former inversion mask register 32 is updated from the former inversion mask $M_1$ to the new inversion mask $M_2$. In operation S55, the access pending flag K=0 is set.

Figure 9:
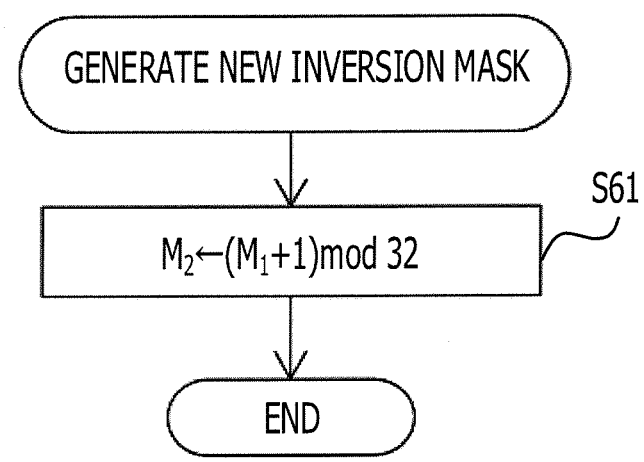
FIG. 9 depicts an example of a generating process of a new inversion mask.

FIG. 9 depicts an example of a generating process of a new inversion mask. In operation S61, since the number of address bits is 32, the reminder obtained when the former inversion mask $M_1$ incremented by 1 is divided by 32 is set to the new inversion mask $M_2$. When the number of address bits is 16, the reminder obtained when division by 16 is performed is used. The new inversion mask $M_2$ may be generated not by the method depicted in FIG. 9 but by a method of using Gray code or the like.

Figure 10:
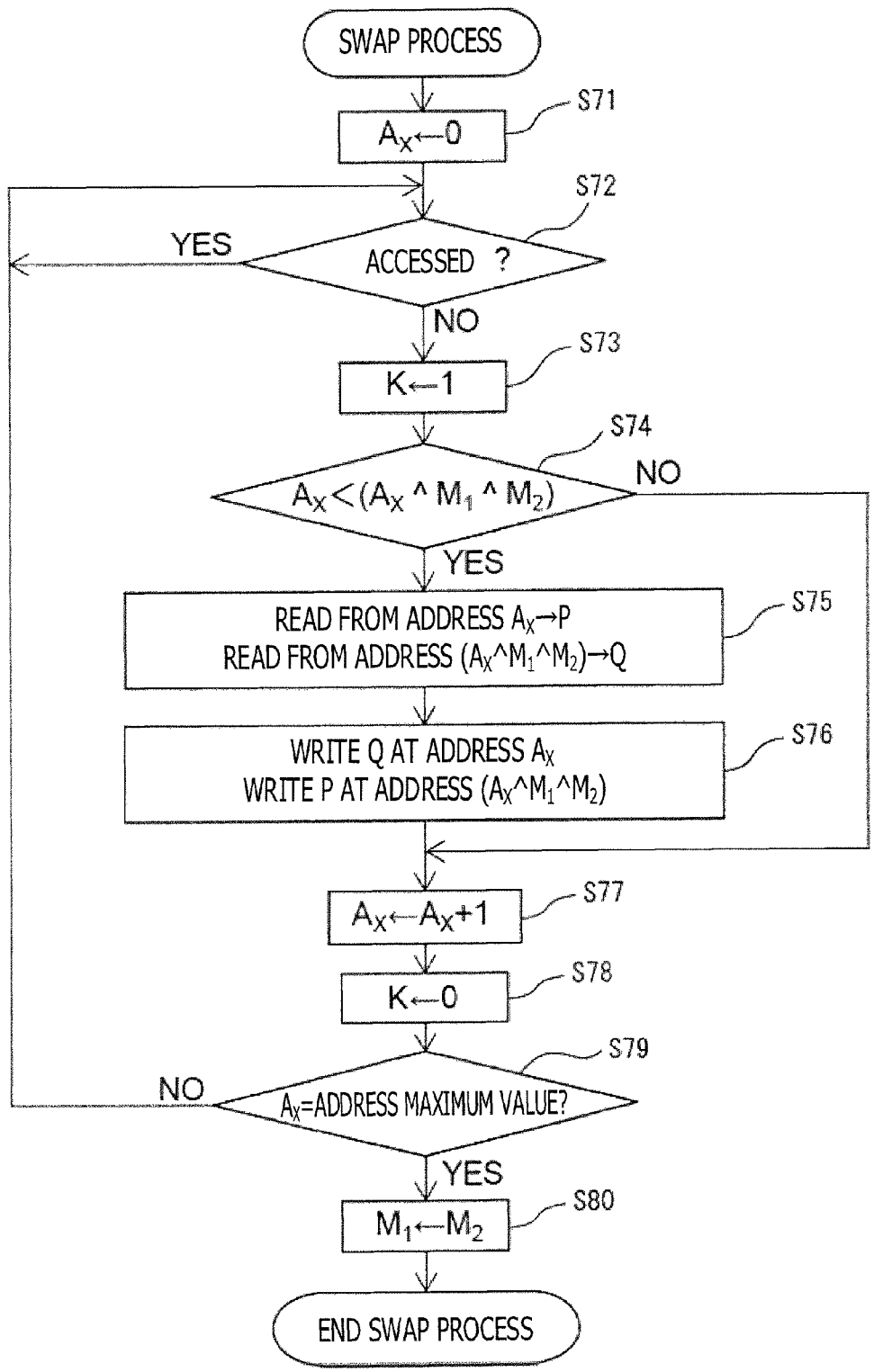
FIG. 10 depicts an example of a swap process.

FIG. 10 depicts an example of a swap process. In operation S71, the swap address $A_X$ is initialized at 0. In operation S72, it is determined whether an access request has come from the CPU 1 (whether the write signal $W_S$ or the read signal $R_S$ indicates 1). If an access request has come, the process waits. During this waiting, the memory unit 11 may be accessed from the CPU 1. When an access request does not come, the process proceeds to operation S73.

In operation S73, the access pending flag K=1 is set. In operation S74, it is determined whether the swap address $A_X$ is smaller than the exclusive OR (XOR) of the swap address $A_X$, the former inversion mask $M_1$, and the new inversion mask $M_2$ ($A_X < A_X \wedge M_1 \wedge M_2$?). When the swap address $A_X$ is smaller than the XOR, the process proceeds to operation S75. When the swap address $A_X$ is equal to or larger than the XOR, swapping has been performed, and therefore the process proceeds to operation S77.

In operation S75, data is read from the address $A_X$ of the memory unit 11 and retained as P in a register, and data is read from the address $A_X \wedge M_1 \wedge M_2$ and retained as Q in the register. In operation S76, the data Q is written at the address $A_X$ of the memory unit 11, and the data P is written at the address $A_X \wedge M_1 \wedge M_2$ of the memory unit 11.

In operation S77, the swap address $A_X$ is incremented by 1. In operation S78, the access pending flag K=0 is set. In operation S79, it is determined whether the swap address $A_X$ has reached an address maximum value. If the swap address $A_X$ has not reached the address maximum value, the process returns to operation S72. If the swap address $A_X$ has reached the address maximum value, the process proceeds to operation S80.

In operation S80, the swap process ends. Therefore, the new inversion mask $M_2$ is stored in the former inversion mask register 32, and the former inversion mask $M_1$ is replaced by the new inversion mask $M_2$. In this manner, the swap process ends. During the swap process, every time data for one line (one address) is replaced by data for another line, the access pending flag K=0 is set. Therefore, a long halt of access from the CPU 1 based on the swap process may be reduced.

Figure 11:
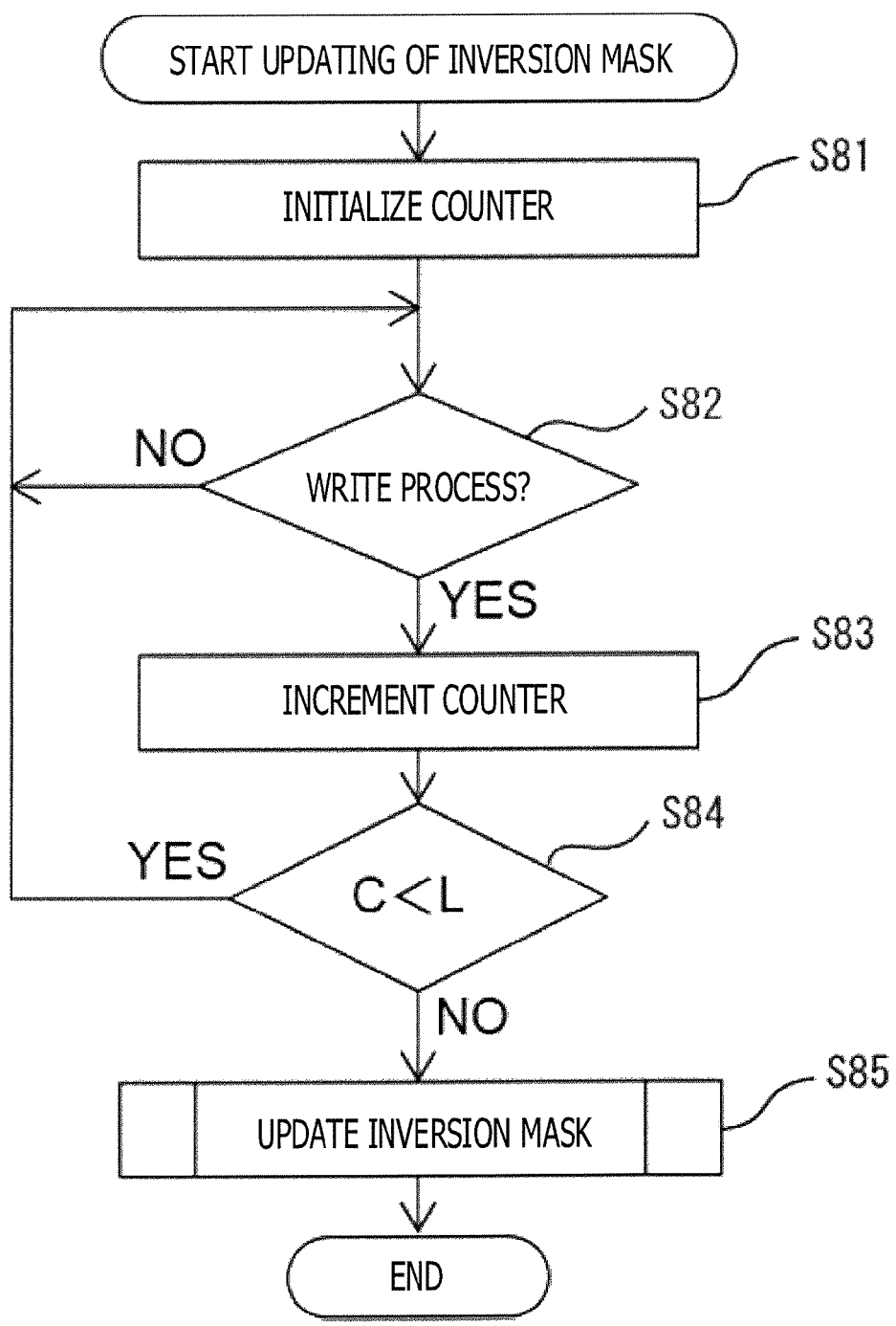
FIG. 11 depicts an example of starting updating of an inversion mask.

FIG. 11 depicts an example of starting updating of an inversion mask. In operation S81, the counter is initialized. Initialization may be performed, for example, after power-on reset or an inversion mask updating process.

In operation S82, it is determined whether writing has been performed. The process waits until writing is performed. When writing is performed, the process proceeds to operation S83. In operation S83, the counter is increased (incremented) by 1.

In operation S84, it is determined whether the count value has reached a value L. If the count value has not reached the value L, the process returns to operation S82. If the count value has reached the value L, the process proceeds to operation S85. In operation S85, the inversion mask updating process depicted in FIG. 8 may be performed.

In the semiconductor storage device (memory), as depicted in FIG. 11, the inversion mask updating process is started every time a write process is performed L times. Alternatively, the inversion mask updating process may be started according to another determination criterion.

Figure 12A:
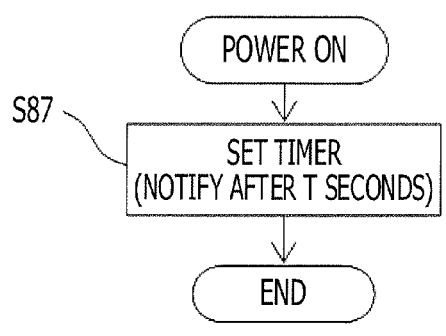
FIG. 12A and FIG. 12B depict an example of starting updating an inversion mask.
Figure 12B:
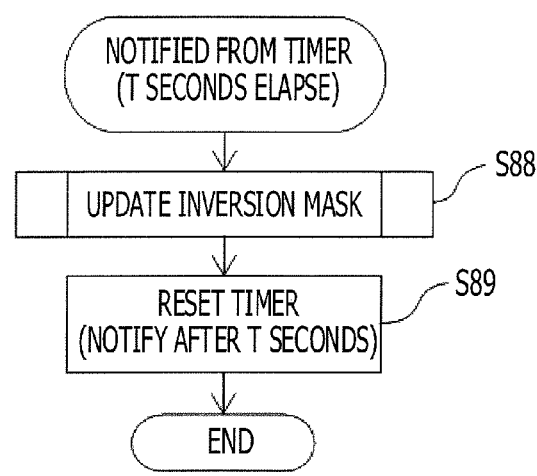

FIG. 12A and FIG. 12B depict an example of starting updating an inversion mask. In FIG. 12A and FIG. 12B, an inversion mask updating process is started in accordance with an operation time. FIG. 12A depicts a timer process, and FIG. 12B depicts a process started by the timer. As depicted in FIG. 12A, when the semiconductor storage device (memory) is powered on, the timer is set in operation S87 so that a notification is issued after T seconds.

As depicted in FIG. 12B, if T seconds elapses and a notification comes from the timer, the inversion mask updating process depicted in FIG. 8 is performed in operation S88. In operation S89, the timer is reset to end the process.

In the semiconductor storage device (memory) of the present embodiment, as depicted in FIG. 9, the new inversion mask is generated by a reminder calculation regarding the immediately-preceding inversion mask, but may be generated by another method.

Figure 13:
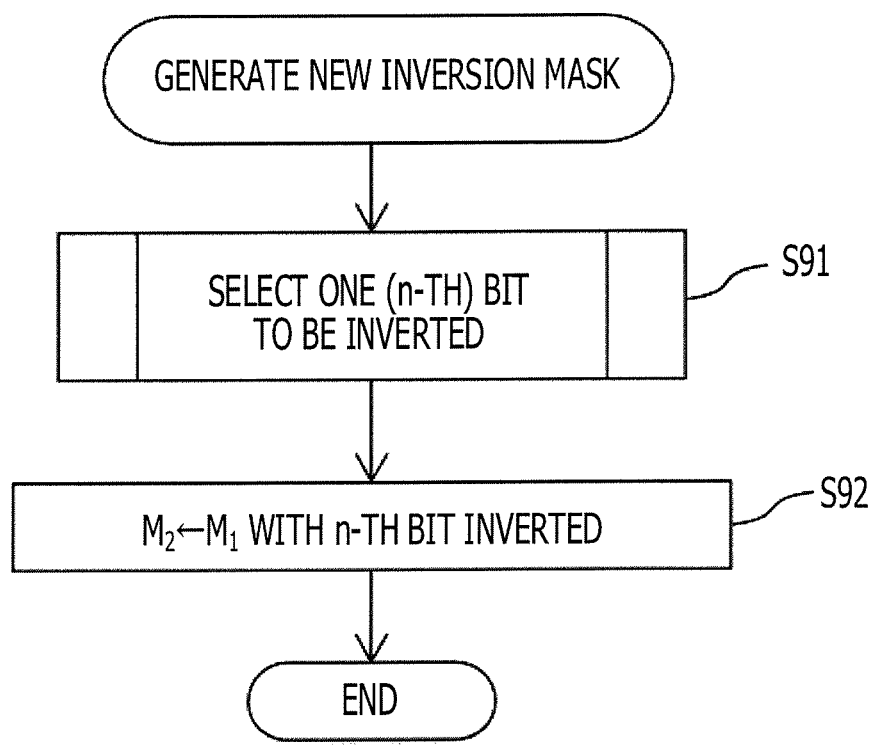
FIG. 13 depicts an example of a generating process of a new inversion mask.

FIG. 13 depicts an example of a generating profess of a new inversion mask. In operation S91, a (n-th) bit to be inverted with the former inversion mask $M_1$ is selected. In operation S92, the n-th bit of the former inversion mask $M_1$ is inverted and set as the new inversion mask $M_2$.

Figure 14A:
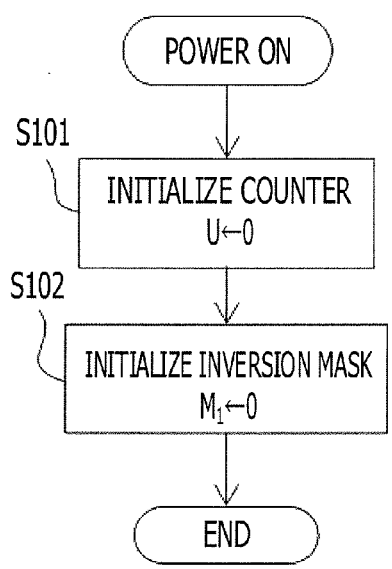
FIG. 14A and FIG. 14B depict an example of a generating process of an inversion mask.
Figure 14B:
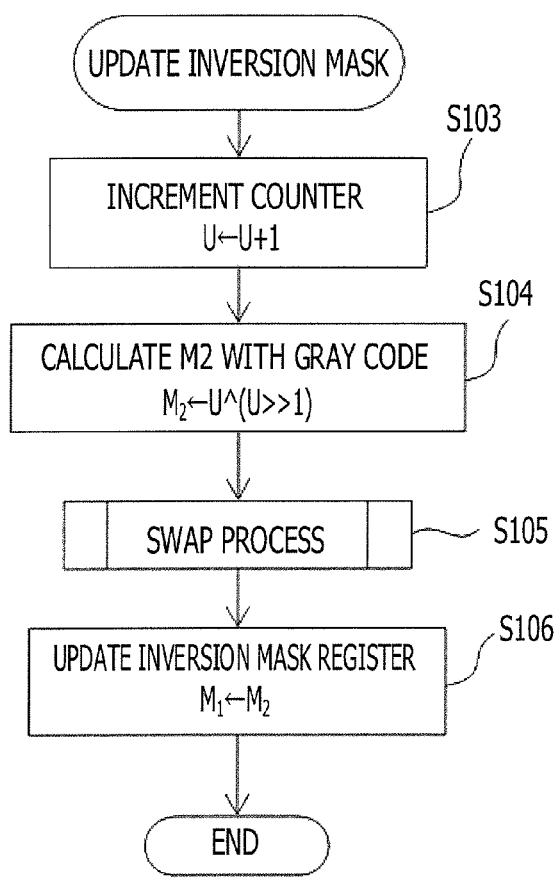

FIG. 14A and FIG. 14B depict an example of a generating process of an inversion mask. FIG. 14A depicts an initializing process, and FIG. 14B depicts an inversion mask updating process.

As depicted in FIG. 14A, upon power-on of the semiconductor storage device (memory), a counter value U for code generation is initialized in operation S101. Operation S101 may be performed upon power-on or at the time of shipping of the semiconductor storage device (memory). In operation S102, the inversion mask is initialized, and the former inversion mask $M_1=0$ is stored in the former inversion mask register 32.

When the inversion mask updating process is started by the method depicted in FIG. 11, FIG. 12A, or FIG. 12B or the like, the counter is incremented in operation S103 to increase the counter value U by 1. In operation S104, a value of the new inversion mask $M_2$ is calculated based on a Gray code in accordance with the counter value U. For example, the XOR of a value obtained by shifting the counter value U rightward by one bit and the counter value U is calculated.

FIG. 15 depicts an example of a correspondence between binary numbers and Gray codes. In FIG. 15, a correspondence between binary numbers of three bits and Gray codes is depicted. As depicted in FIG. 15, one of three bits is different between adjacent Gray codes. The same may apply to another number of bits.

In operation S105 depicted in FIG. 14B, the swap process depicted in FIG. 10 is performed. In operation S106, since the swap process has ended, the new inversion mask $M_2$ is stored in the former inversion mask register 32, and the former inversion mask $M_1$ is replaced by the new inversion mask $M_2$.

Figure 16A:
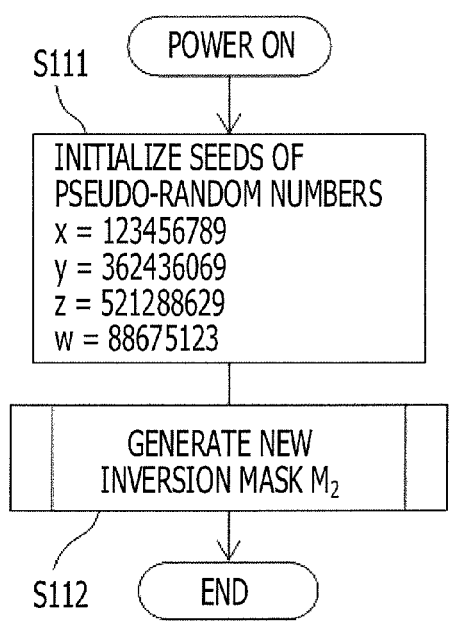
FIG. 16A and FIG. 16B depict an example of a generating process of a new inversion mask.
Figure 16B:
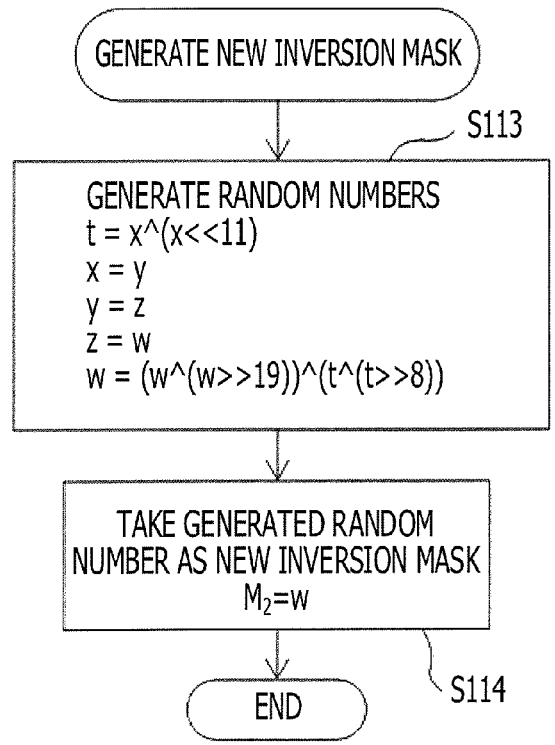

FIG. 16A and FIG. 16B depict an example of a generating process of a new inversion mask. In FIG. 16A and FIG. 16B, a new inversion mask is generated by using random numbers generated by using the pseudo-random number generation algorithm Xorshift. FIG. 16A depicts initialization of seeds of pseudo-random numbers, and FIG. 16B depicts generation of a new inversion mask.

As depicted in FIG. 16A, upon power-on of the semiconductor storage device (memory), seeds of pseudo-random numbers to be set to x=123456789, y=362436069, z=521288629, and w=88675123 are initialized in operation S111. Operation S101 may be performed upon power-on or at the time of shipping of the semiconductor storage device (memory).

In operation S112, the new inversion mask $M_2$ is generated based on the initial values by a process depicted in FIG. 16B.

As depicted in FIG. 16B, in operation S113, the XOR of x and a value obtained by shifting x leftward by 11 bits is calculated and set as t. Also, x=y, y=z, and z=w are set. The XOR of w, a value obtained by shifting w rightward by 19 bits, and a value obtained by shifting t rightward by 8 bits is calculated and set as a new w. In operation S114, w generated in operation S113 is set to the new inversion mask $M_2$.

In the semiconductor storage device, access from the CPU 1 (a write process or read process) is acceptable even in the course of a swap process. For this reason, there are two cases, for example, a swapped case where swapping of the data at the address based on the former inversion mask to the data at the address based on the new inversion mask has been completed in the course of the swap process and a non-swapped case where the above-described swapping has not been completed. In the semiconductor storage device, it is determined whether the logical address $A_L$ from the CPU 1 is a swapped address or non-swapped address, and address translation is performed.

Figure 17:
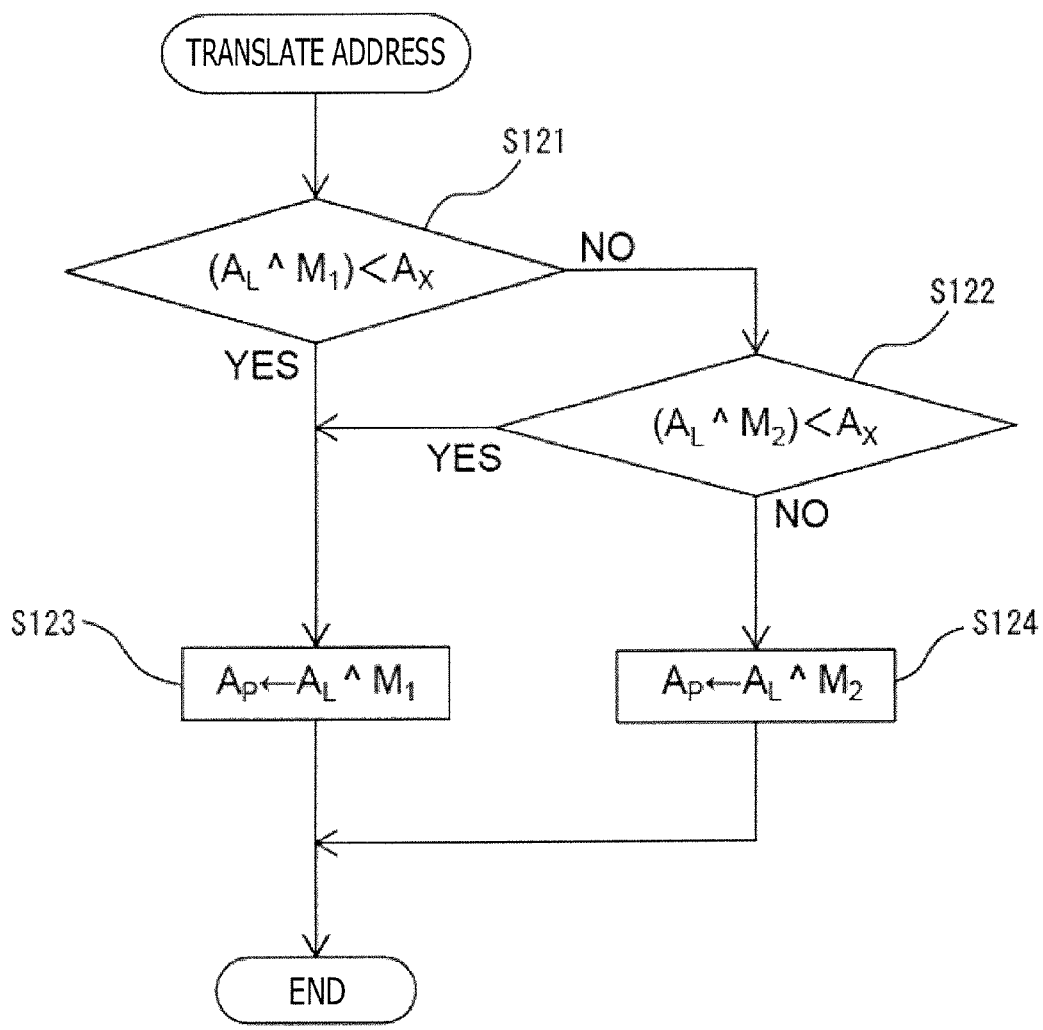
FIG. 17 depicts an example of an address translating process.

FIG. 17 depicts an example of an address translating process. In FIG. 17, an address translating process during a swap process is depicted. In operation S121, it is determined whether the XOR of the logical address $A_L$ and the former inversion mask $M_1$ is smaller than the swap address $A_X$. When the XOR is smaller than the swap address $A_X$, the process proceeds to operation S123. Otherwise, the process proceeds to operation S122.

In operation S122, it is determined whether the XOR of the logical address $A_L$ and the new inversion mask $M_2$ is smaller than the swap address $A_X$. When the XOR is smaller than the swap address $A_X$, the process proceeds to operation S123. Otherwise, the process proceeds to operation S124.

In operation S123, since the address is a non-swapped address, the XOR of the logical address $A_L$ and the former inversion mask $M_1$ is set to the physical address $A_P$. In operation S124, since the address is a swapped address, the XOR of the logical address $A_L$ and the new inversion mask $M_2$ is set to the physical address $A_P$.

As preconditions, the memory unit 11 may have N lines, and the address may be 0, 1, . . . , N−1. A limit of the write count for one line is set as $W_{max}$ and, when the write count reaches $W_{max}$, that line may be failed. Every time writing is performed T times, the inversion mask is updated. For example, a swap cycle may be T. A new inversion mask is generated with a pseudo-random number generation algorithm.

A distribution of the write count for one line in one cycle (writing T times) is taken as $\sigma^2$. An average write count for one line is T/N. The write count is increased by 1 due to writing by swapping. Therefore, for example, since each line has one overhead by swapping, an average write count for each line of the memory including this overhead is T/N+1.

Since updating to a random inversion mask is performed for each cycle, the physical address corresponding to a specific logical address randomly changes. For this reason, according to the central limit theorem, an average total write count for one line up to k cycles is k(T/N+1), which approximates to the normal distribution of a distribution $k \cdot \sigma^2$.

Therefore, the probability that the write count for one line is equal to or smaller than $W_{max}$ has a cumulative distribution from 0 to $W_{max}$ represented by equation (1).

$$\frac{1}{2}\left(1 + \operatorname{erf}\frac{W_{max} - k \cdot \left(\frac{T}{N} + 1\right)}{\sqrt{2 \cdot k \cdot \sigma^2}}\right) \tag{1}$$

The function erf represents an error function.
The probability that the write count for all lines is equal to or smaller than $W_{max}$ is as represented by equation (2).

$$\left\{\frac{1}{2}\left(1 + \operatorname{erf}\frac{W_{max} - k \cdot \left(\frac{T}{N} + 1\right)}{\sqrt{2 \cdot k \cdot \sigma^2}}\right)\right\}^N \tag{2}$$

Figure 18:
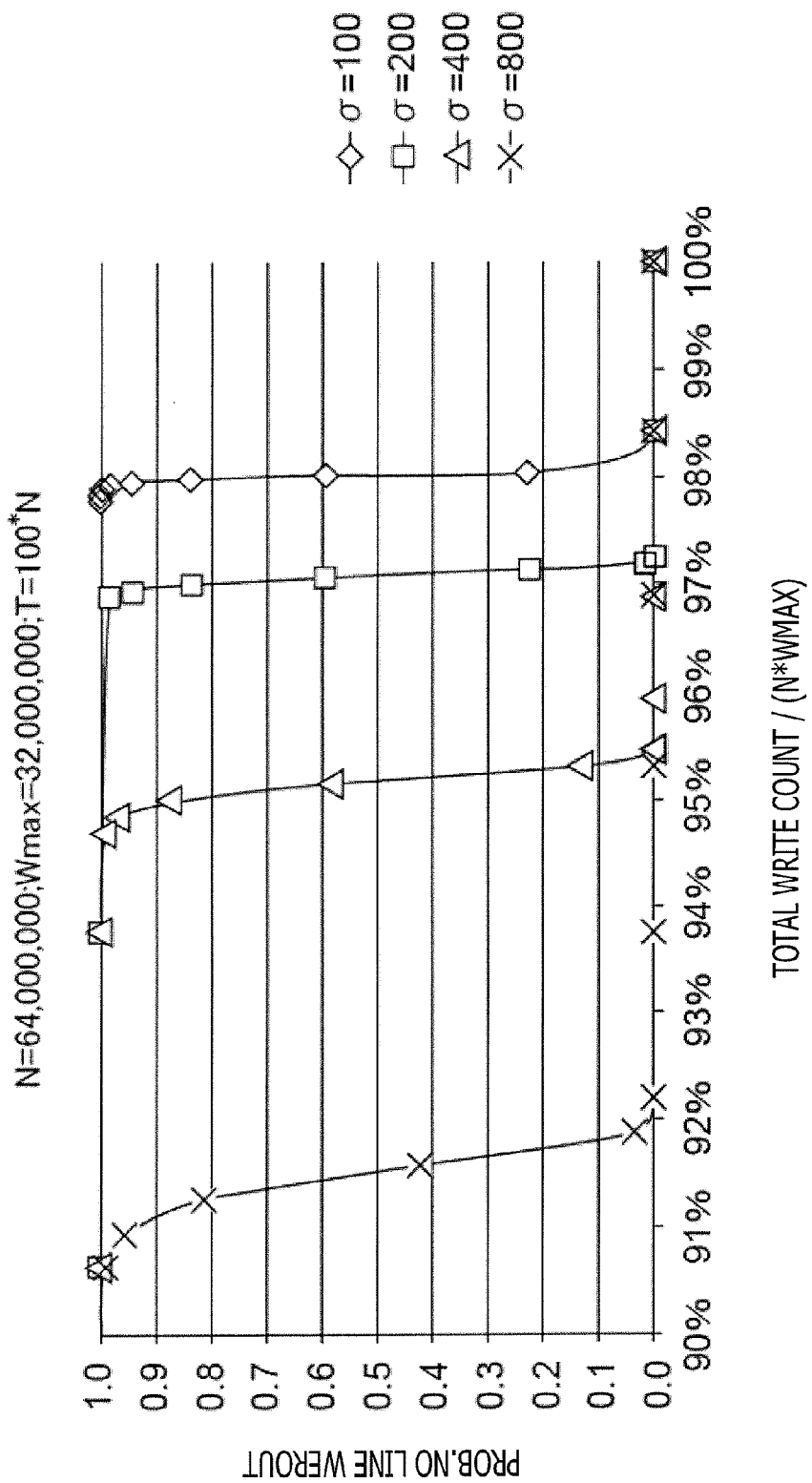
FIG. 18 depicts an example of calculation results.

FIG. 18 depicts an example of calculation results. FIG. 18 depicts a graph indicating the results calculated based on the above-described preconditions and equations. The vertical line represents probabilities that all of N lines are not failed. The horizontal line represents values obtained by normalizing a total write count with the maximum write count×the line count N. In ideal leveling, the calculation result indicates 100%.

In FIG. 18, the calculation results are plotted with the standard deviations σ of the write count for one line in one cycle being 100, 200, 400, and 800, and the entire memory is abruptly failed near 98%, 97%, 95%, and 91%, respectively.

The standard deviation σ=100 may correspond to the case of write concentration on 50% of all lines. With random address translation, the lifetime is prolonged from 50% to approximately 98%. Similarly, the lifetime is prolonged from 20% of all lines to approximately 97% in the case of σ=200, from approximately 5.8% of all lines to approximately 95% in the case of σ=400, and from approximately 1.5% of all lines to approximately 91% in the case of σ=800.

A calculation of r indicating the degree of write concentration is made as follows. The standard deviation σ at the time of write concentration on r·N lines is represented by equation (3), where an average value μ=T/N is assumed:

$$\sigma^2 = \frac{1}{N}\left\{(1-r)N(0-\mu)^2 + rN\left(\frac{\mu N}{r} - \mu\right)^2\right\}$$

$$= \mu^2\left(\frac{1}{r} - 1\right)$$

Therefore, $$r = \frac{1}{\frac{\sigma^2}{\mu^2} + 1} \quad (3)$$

The lifetime of the semiconductor storage device may be prolonged.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A semiconductor storage device comprising:
    a storage;
    an address translater configured to translate a logical address for access to the storage to a physical address based on address translation information; and
    a controller configured to output the address translation information to the address translater,
    wherein the controller, when the address translation information is changed, interchanges a first physical address based on first address translation information before the change and a second physical address based on second address translation information after the change in the storage.

2. The semiconductor storage device according to claim 1, wherein the controller changes the address translation information when a write count to the storage reaches a count.

3. The semiconductor storage device according to claim 1, wherein the controller changes the address translation information periodically.

4. The semiconductor storage device according to claim 1, wherein
    the address translation information includes a translation mask including a plurality of bits, and
    the address translater translates the logical address to the physical address by computing an exclusive OR of the logical address and the translation mask.

5. The semiconductor storage device according to claim 4, wherein the controller changes the address translation information so that only one bit of the plurality of bits is different between a first translation mask before the change and a second translation mask after the change.

6. The semiconductor storage device according to claim 5, wherein the controller changes the translation mask as Gray code.

7. The semiconductor storage device according to claim 5, wherein the controller generates the second translation mask in accordance with random numbers.

8. The semiconductor storage device according to claim 1, wherein the translater, when the storage is accessed at the interchanging, translates a logical address for which the interchanging has not completed to the first physical address based on the first address translation information.

9. The semiconductor storage device according to claim 1, wherein the translater, when the storage is accessed at the interchanging, translates a logical address for which the interchanging has completed to the second physical address based on the second address translation information.

10. The semiconductor storage device according to claim 1, wherein the storage includes a non-volatile memory.

11. A semiconductor storage device control method comprising:
    translating a logical address for access to a semiconductor storage device to a physical address based on address translation information;
    changing the address translation information from first address translation information to second address translation information at a time; and
    interchanging data of a first physical address based on the first address translation information and data of a second physical address based on the second address translation information in a storage in the changing.

12. The semiconductor storage device control method according to claim 11, wherein the time is a time when a write count to the storage reaches a count.

13. The semiconductor storage device control method according to claim 11, wherein the time is a time when a predetermined time elapses.

14. The semiconductor storage device control method according to claim 11, further comprising,
    translating a logical address for which the interchange has not ended to the first physical address based on the first address translation information when the storage is accessed during the interchanging.

15. The semiconductor storage device control method according to claim 11, further comprising,
    translating a logical address for which the interchange has ended to the second physical address based on the second address translation information when the storage is accessed during the interchanging.

* * * * *